March 5, 1935.  C. A. PENDLETON  1,993,180
MEANS FOR REAMING BEARINGS
Filed Feb. 26, 1934  4 Sheets-Sheet 1
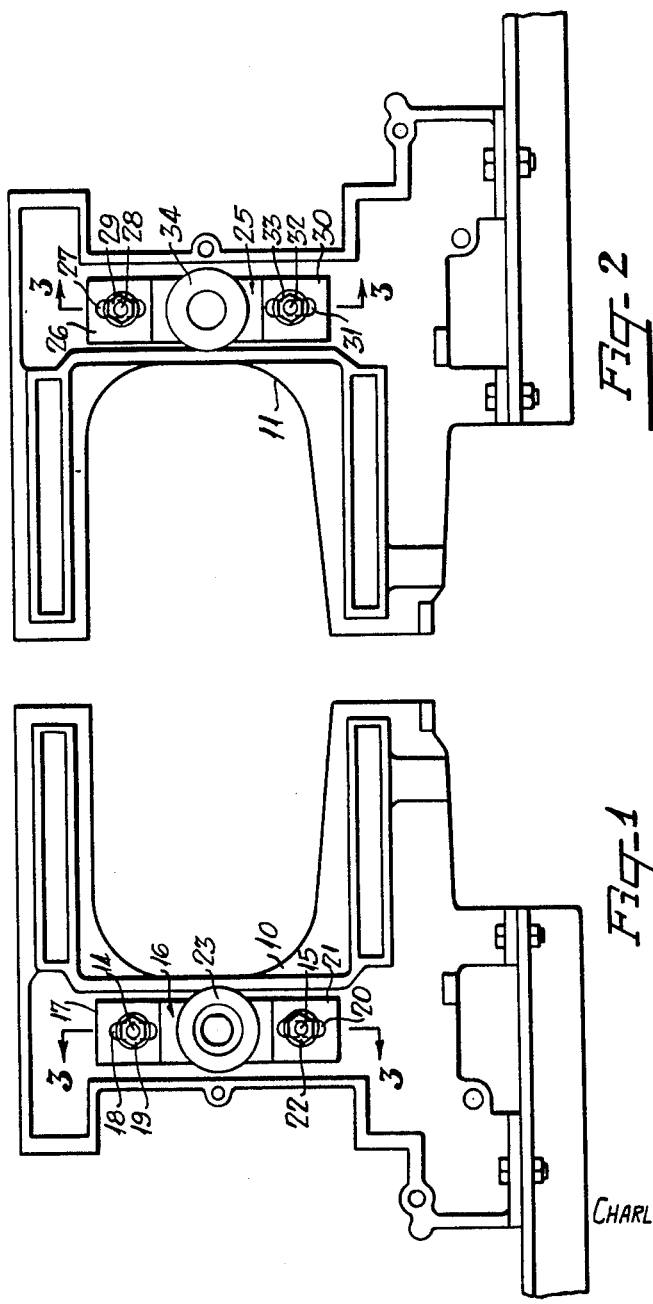
Charles A. Pendleton
Inventor
By Paul S. Eaton
Attorney

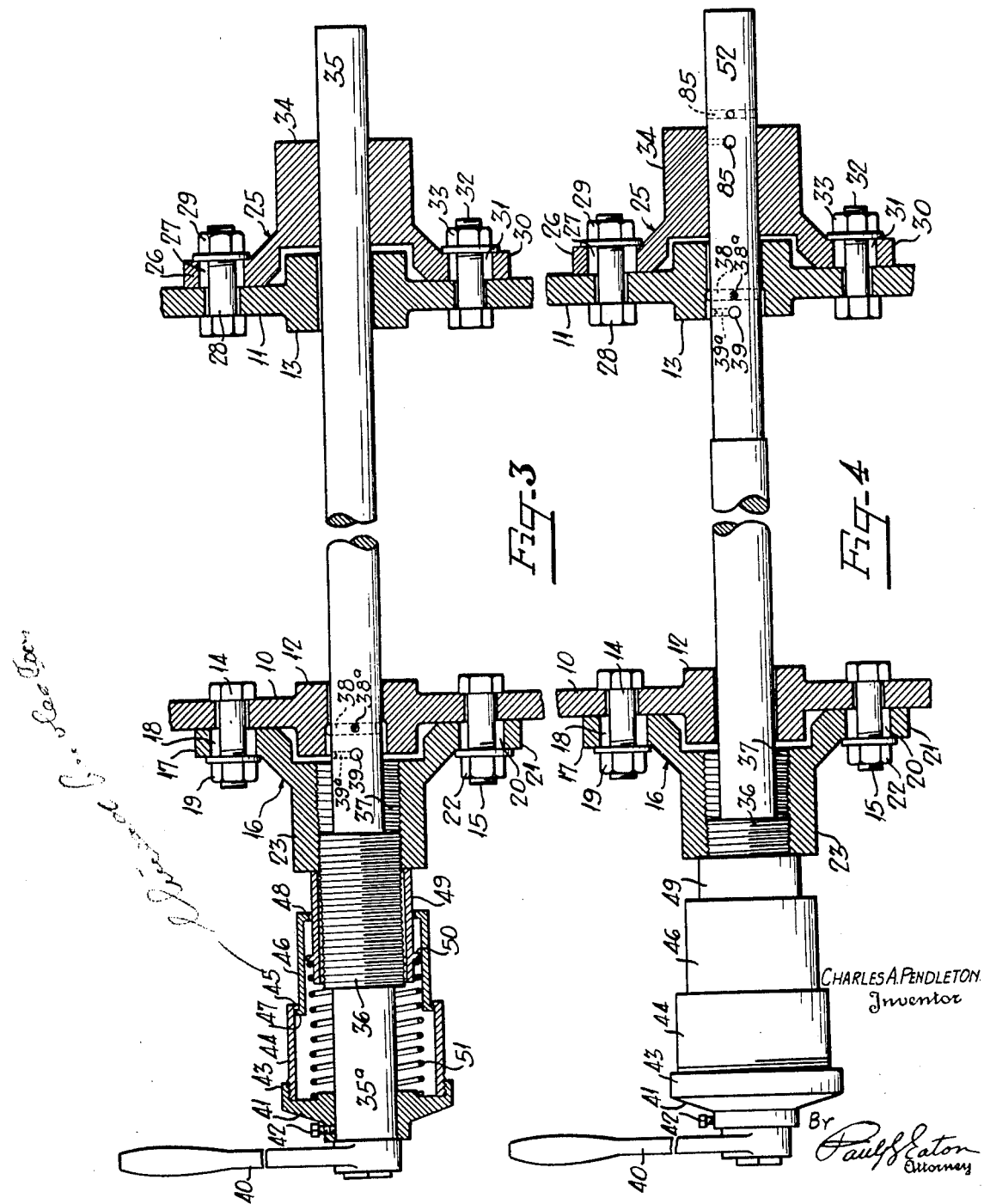

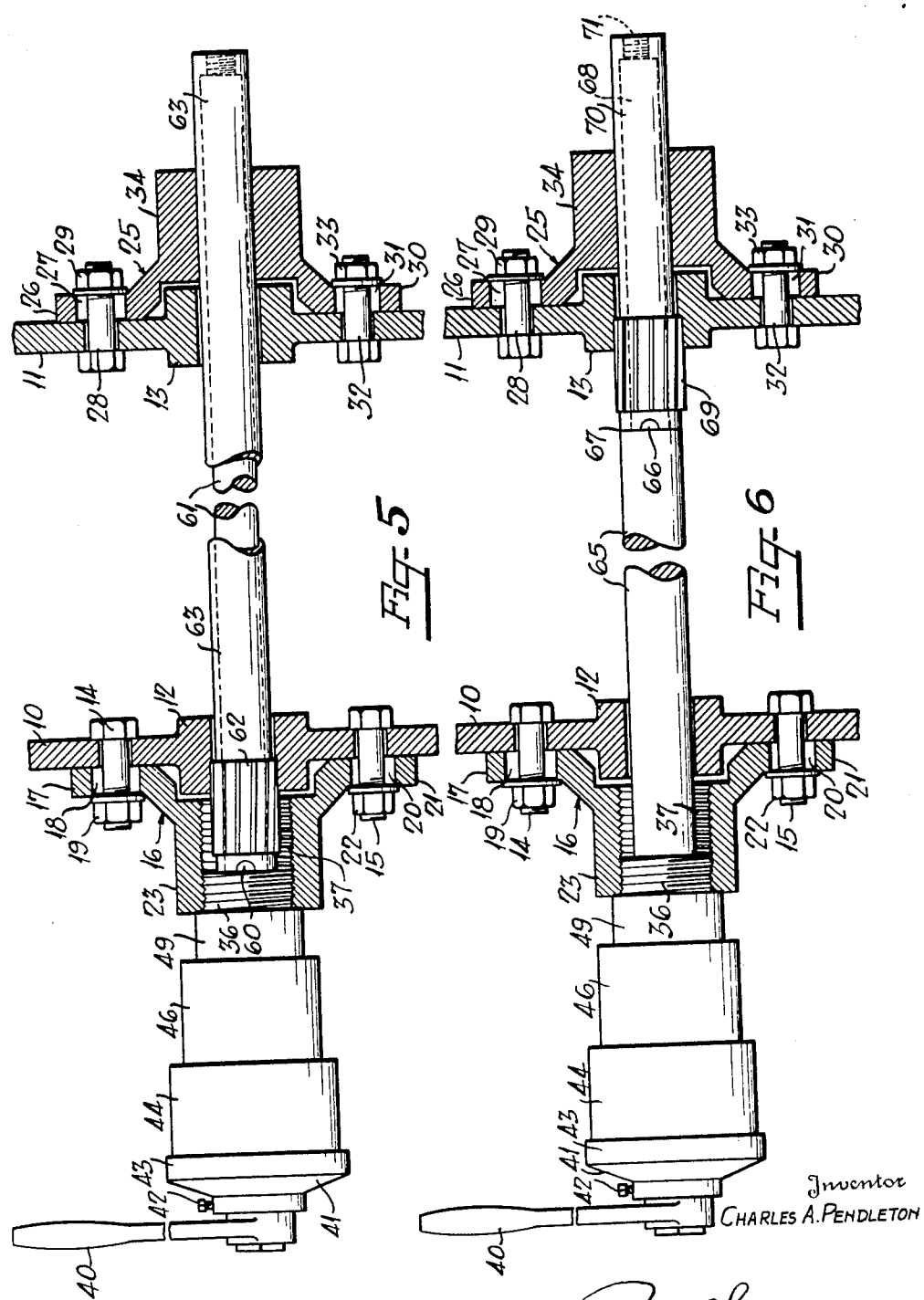

March 5, 1935.  C. A. PENDLETON  1,993,180
MEANS FOR REAMING BEARINGS
Filed Feb. 26, 1934   4 Sheets-Sheet 4
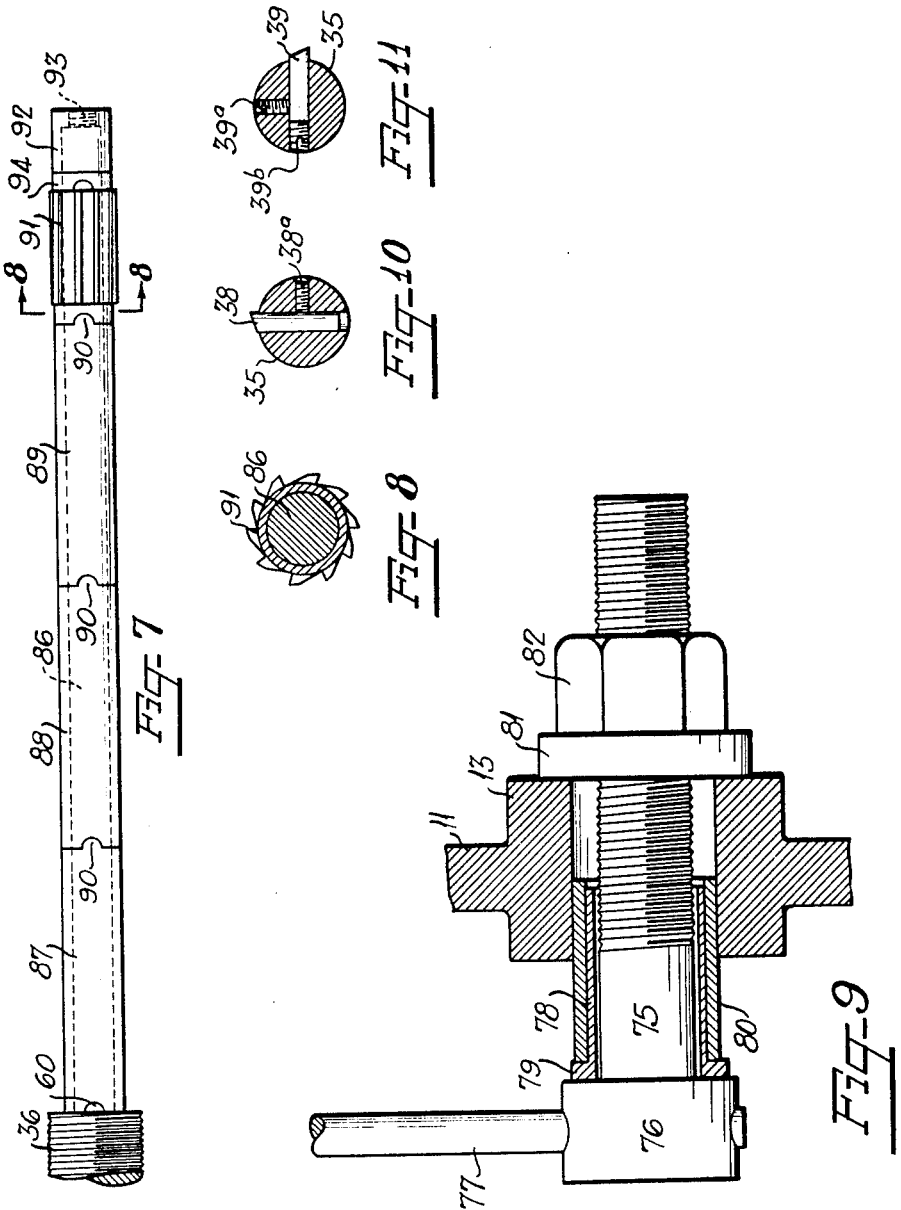
CHARLES A. PENDLETON
Inventor
By Paul S. Eaton
Attorney Patented Mar. 5, 1935

1,993,180

UNITED STATES PATENT OFFICE 1,993,180

MEANS FOR REAMING BEARINGS

Charles A. Pendleton, Cramerton, N. C.

Application February 26, 1934, Serial No. 713,026

2 Claims. (Cl. 77—2)

This invention relates to a method and means of reaming out worn bearings which are disposed in spaced relation to each other for receiving a straight shaft and placing therein a bushing of proper size to receive the shaft so that the bearings or bushings will be perfectly alined for reception of the shaft.

Heretofore, in dobby looms great difficulty has been experienced in reaming the bearings in the side frames of the dobby and placing bushings therein so as to support the rocker arm shaft in a suitable manner. It has been considered almost impossible to get these two bearings in the side frames of the dobby in perfect alinement unless the dobbies were dismantled and placed in a suitable machine, whereas, by the use of my method and mechanism it is possible to remove the rocker shaft from the bearings and remount the bearings in perfect alinement with each other and place in the reamed out portion a suitable bushing into which the rocker shaft can be replaced so that the rocker shaft will be properly alined and ready for continued efficient use.

It is therefore an object of this invention to provide a method and means for reaming the bearings for the rocker shaft of a dobby in perfect alinement with each other, without dismantling the side frames, so that suitable bushings or bearings can be placed therein for the reception of the rocker shaft, which bearings will be in perfect alinement with each other.

It is a further object of this invention to provide a method and means for reworking the bearings in members which are spaced apart from each other so as to remount the bearing portion in perfect alinement with each other for the reception of a straight shaft.

Some of the objects of the invention having been stated, other objects will appear as the description proceeds when taken in connection with the accompanying drawings, in which:—

Figure 1 is a side elevation of a dobby frame attached to a loom showing one of my alining brackets in position;

Figure 2 is a side elevation of the other side of the dobby from that shown in Figure 1 and showing a second alining bracket secured thereto;

Figure 3 is a vertical sectional view taken along line 3—3 in Figures 1 and 2 showing a pair of bearings in a dobby frame in vertical section and showing one of the tools partly in elevation and partly in vertical section which are employed for reaming out these bearings in the first operation;

Figure 4 is a view similar to Figure 3 but showing the tool employed for reaming out the bearing farthest removed from the operating end of the tool;

Figure 5 is a view similar to the preceding figures but showing a different kind of tool in position for reaming the bearing nearest to the handle of the operator;

Figure 6 is a view similar to Figure 5 but showing a tool for further reaming the farther bearing in the pair of spaced bearings such as in a dobby frame;

Figure 7 is a view of the right hand portion of a tool as shown in Figure 6 and showing the reamer being mounted in an extensible manner thereon for use in connection with members spaced apart from each other at variable distances;

Figure 8 is a vertical sectional view taken along line 8—8 in Figure 7;

Figure 9 is a vertical sectional view showing means for placing a bushing in a reamed out bearing;

Figure 10 is a vertical sectional view taken through the tool shown in Figures 3 and 4, showing the means for mounting the first cutting knife in the tool;

Figure 11 is a view similar to Figure 10 but showing the means for mounting the second cutting knife.

Referring more specifically to the drawings let us assume that the portions 10 and 11 are the side frame members of a dobby, they being spaced farther apart than as shown in the drawings, depending upon the number of dobby jacks mounted in the dobby frames. These frames have bosses 12 and 13 thereon penetrated by alined holes which serve as bearings for a rocker shaft to which a suitable rocker arm is secured and the rocker arm drives suitable jack knives which are engaged by jacks to manipulate the harness mechanism of the loom. Suitable fingers control the jacks which are operated selectively by a pattern mechanism. This is an example of only one of the mechanisms in which my invention may be usefully employed, it being particularly adapted for this operation because it permits reworking of the bearing portion of the side frames of the dobbies without the necessity of dismantling any portion of the dobby whatever, except the removal of the rocker arm shaft therefrom. The rocker arm shaft, through continued use, of course wears the cast iron bearings in bosses 12 and 13, resulting in inferior work and requiring that the dobby head be rebuilt and reconstructed by placing new bearings therein.

Heretofore, one method employed has been to dismantle the dobby and to place the side frame members 10 and 11 in suitable complicated mechanisms for reaming out the bearing portion to a perfect round hole which is concentric with the original hole, and fitting therein a suitable bushing. Even through this complicated operation there often resulted a set of bearings which were not in perfect alinement and which imposed lateral thrusts of the rocker shaft mounted therein for oscillation. I have discovered that these dobbies may be reconstructed without the necessity of the dismantling of any of the parts thereof. The dobby frames 10 and 11 usually have suitable holes disposed above and below the bearing portions or bosses 12 and 13 and even if these holes were not present it is very easy to drill suitable holes through these frames which in no wise interfere with the effectiveness of the dobby.

In the hole in frame 10, for example, I mount suitable bolts 14 and 15 which are selected so as to be smaller than the holes penetrated by them and the outer ends of these bolts project some distance from the outer edges of the frame. I then provide a guide member 16 having an upstanding portion 17 with an elongated hole 18 therein which is penetrated by bolt 14 and a nut 19 is threadably secured on the outer end of bolt 14. Bolt 15 penetrates an elongated hole 20 in downwardly projecting portion 21 of member 16 and a suitable nut 22 is secured on the outer end thereof whereby a member 16 can be adjusted with relation to member 10.

Member 16 has a tubular portion 23 which is threaded interiorly and by means of adjusting member 16 and then securing it in adjusted position by securing nuts 19 and 22 it is seen that the axis of the interiorly threaded portion can be made to coincide with the axis of the holes through bosses 12 and 13. With member 16 secured in position, but not securely fixed in position, as it has not yet been properly adjusted, a member 25 is fitted to the outside surface of member 11. This member 25 has an upstanding portion 26 having an elongated slot 27 therein penetrated by a bolt 28 whose head is on the inside surface of member 11 whereas a nut 29 is secured on the outside end thereof for adjustably securing portion 26 in position. Member 28 also has a downwardly projecting portion 30 which has an elongated slot 31 therein penetrated by a bolt 32 whose head is disposed on the inside surface of frame member 11 and whose outer threaded end has a nut 33 thereon. Member 28 has a tubular portion 34 having a smooth bore therein.

With the parts 16 and 25 secured roughly in position a suitable primary tool is inserted through these members and the extended end 35 of the tool penetrates the smooth bore in portion 34 which is made to form a sliding fit with the end of the tool 35. This properly alines the bore in portion 34 with the hole through boss 13. This hole is usually somewhat worn, but in any event the member 25 will probably be raised upwardly slightly, so as to prevent the bearing member from being lowered by the hole through the boss 13 at a lower position than where it formerly was positioned.

In any event, when member 25 is in proper position, nuts 29 and 33 are driven home to firmly secure member 25 in position. Then the tool which has the threaded portion 36 is rotated until these threads 36 engage the interior threads 37 on the interior of member 23. While this operation is being carried out, of course nuts 19 and 22 are not driven home and therefore when threaded portion 36 enters threaded portion 23 this adjusting block 16 is in proper position and at this point nuts 19 and 22 are driven home which perfectly alines the axes of the portions 23 and 34 as well as the center of the holes in bosses 12 and 13. Tool 35 has mounted therein a plurality of radially disposed cutting bits 38 and 39 which are secured therein by means of adjusting screws 38a and 39a respectively, as shown in Figures 10 and 11. Cutting tool 38 is the leading cutting tool and cuts a bore of a slightly smaller diameter than the tool 39 which is spaced a short distance behind tool 38. The tool 39 has another screw 39b which allows minute adjustment of the cutting blade to determine the exact size of the bore for reaming. The tool 35 may be turned by any suitable means such as a ratchet wrench 40 but it is evident that any source of driving power may be employed. The description of tool 35 might well stop here but in order to protect the threaded portion thereof, I have devised a plurality of spring pressed members to form a housing for the threaded portion. I secure a circular cuff member 41 by any suitable means such as a set screw 42 to the large butt end portion 35a of tool 35. This has a peripheral laterally projecting flange 43 thereon which is threaded interiorly to receive a sleeve 44 which is restricted at its outer end as at 45 to limit right hand movement of a sleeve 46 which has a peripheral flange 47 thereon to prevent sleeve 46 from being withdrawn from sleeve 44. Sleeve 46 is restricted as at 48 and slidably receives a sleeve 49 which has a sliding fit on threads 36. Sleeve 49 has a peripheral flange 50 which prevents withdrawal of sleeve 49 from sleeve 46 by a right hand movement in the drawings. In order to normally force sleeves 46 and 49 to telescoping position with relation to sleeve 44, I have provided an extended compression spring 51 which has one end thereof normally pressing against the surface of cuff 41 and the other end thereof pressing against peripheral flange 50 on sleeve 49. This causes the parts to occupy an extended position when not in use and therefore completely covers the threads 36 on the tool and prevents their being scored or mutilated by contact with other objects.

As the threads 36 are driven home in threads 37 in portion 23 during a reaming operation, the sleeves are forced to contracted position as is shown in Figure 3 of the drawings, but of course when the tool is removed from the boring operation the sleeves occupy their normal extended position. It is seen that as tool 35 is rotated the cutters 38 and 39 cut the holes in boss 12 slightly larger and after this operation is completed tool 35 is withdrawn and without any change whatever in the position of the supports 16 and 25, another reaming tool 52 is inserted in like manner, this tool being identical in all respects to the preceding tool except that its cutters 38 and 39 are mounted in the right hand end of tool 52 so as to engage the hole in the farthermost boss 13 and ream it also to the same size as the hole was reamed by the preceding tool 35. The left hand portion of tool 52 may be slightly larger if desired, because the hole in boss 12 has been reamed before tool 52 has been inserted to ream the hole in the boss 13, but if desired, it may be the same size as the tool 35 throughout. The outer portions of the tool are identical to the tool 35 as shown in Figure 3 and bear like reference characters.

Referring now to Figure 5 we see the supports 16 and 25 still attached to frames 10 and 11 and exactly in the same position as it is imperative that the adjustment of these members be not moved or changed until the complete operation of reaming has been effected.

The left hand portion of the tool in Figure 5 is identical to the left hand portion of tool 35, including the threaded portion, and like reference characters apply. Immediately adjacent the right hand end of the threaded portion, it is seen that a pin 60 penetrates shaft 61 and a reamer 62 is slidably mounted on said shaft, being confined against rotative movement on said shaft by having a semi-circular cutaway portion in opposed surfaces thereof which is adapted to engage pin 60 which projects from opposed sides of the shaft. Fitting against the other end of this reamer 62 is a sleeve 63 which is of proper size to fit into the portion 34.

It is to be noted that sleeve 63 has the same outside dimensions as the right hand end of tool 35 so that it forms a sliding fit in the bore in support 34. The right end of shaft 61 is restricted and threaded and threadably penetrates a hole in the plugged end of sleeve 63. By rotative movement of sleeve 63, with relation to shaft 61, the sleeve is driven home to fit against reamer 62 and secures it in position. With the parts thus assembled, a threaded portion 36 of tool 61 is advanced, shown in Figure 5, and the second reaming operation cuts a hole in boss 12 slightly larger than the cutters 38 and 39 did to provide the finished hole in boss 12. With this operation completed, tool 61 is withdrawn from the frames 10 and 11.

The left hand portion of tool 65, as shown in Figure 6, is identical to the structure described in detail in Figure 3, for tool 35 and like references apply. In this fourth operation for reaming the hole in the farthest removed boss 13, the supports 16 and 25 are left in exactly the same position as they were in the preceding operation. Tool 65 has an extended portion projecting to the right in Figure 6 from a threaded portion which enters the support 16 and has a semi-circular pin 66 penetrating the same or these may be formed, if desired, as a pair of bosses extending from a shoulder appearing as at 67, at which point the tool is restricted in size to form a portion 68. This smaller portion 68 is adapted to first receive a reamer 69 having a cutaway portion in the left hand end thereof shown in Figure 6, to fit over the pin or projection 66 to prevent it from having rotating movement on portion 68. Any suitable sleeve 70 is slipped over the restricted portion 68, the right hand end of this sleeve being plugged and having a centrally disposed hole therein threaded to receive the small threaded end 71 of portion 68 and by rotative movement of sleeve 70 with relation to portion 68 the reamer is confined into position. With the tool thus assembled it is inserted into the supports 16 and 25. The tool is given rotative movement and the threads thereon being driven home in the threads 37, causes the reamer to cut as is shown in Figure 6, until the entire boss 13 has been reamed out to the same size as the boss 12 already has been reamed.

It is thus seen that two holes have been reamed of the same size and in perfect alinement in the frames 10 and 11. This being done, the supports 16 and 25 are removed from the frames 10 and 11 and a suitable bolt 75 is provided having a head 76 which has a hole therethrough which is adapted to be penetrated by a suitable rod 77 serving as a handle to prevent rotating movement of bolt 75. On the bolt is mounted a sleeve 78 having an enlarged portion 79 and on this sleeve a suitable bearing, such as bronze, 80 is loosely fitted and the bolt 75 carrying sleeve 78 and bearing 80 is inserted through the hole in boss 13. A washer 81 is loosely fitted around the threaded end of the bolt and a nut 82 is driven home thereon which forces the bearing 80 into the reamed out hole in boss 13. It is noted that I have described the operation of boss 13 so that the handle 77 will be disposed on the inside of the dobby frame and the wrench used for driving the screw 82 home will operate on the outside of the frame free from obstruction.

The bearing having been installed in boss 13, the process is reversed, and another bearing is likewise installed in boss 12 by inserting the bolt 75 first into the right hand end of the hole in boss 12 so as to have the nut 82 engaged by a wrench on the outside of the frame 10. When this operation has been completed a rocker shaft can be installed in the bearing 80 with ease because the bearings are in perfect alinement.

In order to take care of frames of different widths where members 10 and 11 are disposed at different distances apart, the cutters 38 and 39 may be mounted in other holes 85 disposed farther along tool 52, there being several sets of these holes if desired, for reaming the farther side of frames of different widths. Also in the second reamers, as shown in Figures 5 and 6, it is evident that in order to take care of frames of different widths, provision must be made and such provision is shown in Figure 7, in which an extended shaft 86 is provided having a plurality of sleeves 87, 88 and 89 which interlock each other by means of each sleeve having a projection 90 thereon adapted to fit into a notch in the proximate end of the next succeeding sleeve and of course the last sleeve has its notch 90 fitting into a cutaway portion in reamer 91. The reamer 91 may be confined into position by means of sleeve 92 plugged at its end and threadably mounted on threaded portion 93 as has been previously described. Another short sleeve 94, which is similar to the sleeves 87, 88 and 89, except the right hand end does not have a projection 90 thereon, is inserted between sleeve 92 and reamer 91. Since there is no projection on the proximate edges of these two sleeves 92 and 94, sleeve 92 can be screwed home on threaded portion 93 to tighten the various parts in position on shaft 86. It is evident that if reamer 91 be desired to be located at another position on shaft 86 that it could be disposed between sleeves 88 and 89 if desired, instead of the position shown. This provides for reaming the farther bearing portion in frames of different widths for it is seen that it provides for different adjusted positions of reamer 91.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Means for alining the bearing holes for a rocker shaft in side frames of a dobby head for looms comprising a support having means for adjustably securing the same to the exterior surface of one frame, a second support having means for adjustably securing the same to the exterior surface of the other frame, the first support having a hole therein adapted to be alined with the hole in the frame to which it is secured, said hole being larger than the hole in its associated frame and being interiorly threaded, the second support having a hole therein adapted to be alined with the hole in the said other frame and being smaller than the said hole in said other frame, a tool insertable through said supports and said holes, said tool having boring means thereon adapted to pass through said threaded hole to bore one of the holes in one of the frames to a larger size, said tool having a threaded portion adapted to engage said threaded hole to propel the boring means to bore one of said holes.

2. Means for boring the holes on spaced sides of a dobby frame of a loom to a larger size for the insertion of new bearings therein comprising a pair of bearing members having projections thereon provided with enlarged holes, bolts mounted in the spaced sides and penetrating said holes whereby the members may be adjusted with relation to the said holes in said sides of the dobby frame, one of said members having a threaded bore therein adapted to coincide with the hole in its associated frame, the other member having a smooth bore therein adapted to coincide with the hole in the dobby frame with which it is associated, a cutting tool adapted to be inserted through said members and having a threaded portion adapted to engage the threaded hole in one of said members and having a smooth portion adapted to engage the smooth bore in said other member, cutting means on said tool insertable with said tool through said threaded hole for boring one of said holes to a larger dimension.

CHARLES A. PENDLETON.